United States Patent
Ananthanarayanan et al.

(10) Patent No.: US 9,141,685 B2
(45) Date of Patent: Sep. 22, 2015

(54) FRONT END AND BACKEND REPLICATED STORAGE

(75) Inventors: Krishnan Ananthanarayanan, Bothell, WA (US); Sankaran Narayanan, Redmond, WA (US); Dhigha D. Sekaran, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 407 days.

(21) Appl. No.: 13/530,416

(22) Filed: Jun. 22, 2012

(65) Prior Publication Data

US 2013/0346366 A1 Dec. 26, 2013

(51) Int. Cl.
  *G06F 7/00* (2006.01)
  *G06F 17/30* (2006.01)

(52) U.S. Cl.
  CPC ................ *G06F 17/30578* (2013.01)

(58) Field of Classification Search
  CPC .............. G06F 11/2082; G06F 9/5077; G06F 11/2074; G06F 3/065; G06F 3/067; G06F 11/1471; G06F 11/2035; G06F 11/2038; G06F 11/2048; G06F 11/2064; G06F 11/2076; G06F 11/3419; G06F 11/3485; G06F 19/32; G06F 17/30578; G06F 11/2056; G06F 17/30377; G06F 17/30581
  USPC ................................................. 707/656, 658
  See application file for complete search history.

(56) References Cited

U.S. PATENT DOCUMENTS

| | | | |
|---|---|---|---|
| 5,835,711 A * | 11/1998 | Chang et al. .................. 709/232 |
| 6,108,646 A * | 8/2000 | Mohri et al. ........................... 1/1 |
| 6,148,412 A * | 11/2000 | Cannon et al. ............... 714/6.31 |
| 7,631,214 B2 | 12/2009 | Bockhold et al. |
| 7,908,514 B2 | 3/2011 | Thiel et al. |
| 7,941,404 B2 | 5/2011 | Garimella et al. |
| 8,326,798 B1 * | 12/2012 | Driscoll et al. ................ 707/610 |
| 8,949,182 B2 * | 2/2015 | Hildebrand et al. ........... 707/624 |
| 2003/0028587 A1 | 2/2003 | Driscoll et al. |
| 2005/0021869 A1 | 1/2005 | Aultman et al. |
| 2007/0150499 A1 | 6/2007 | D'Souza et al. |
| 2008/0232273 A1 * | 9/2008 | Beckett et al. ................. 370/254 |
| 2009/0157766 A1 | 6/2009 | Shen et al. |
| 2013/0226870 A1 * | 8/2013 | Dash ............................. 707/634 |

OTHER PUBLICATIONS

"Dell/EMC CX3 Family Fibre Channel Storage Systems", Retrieved at <<http://www.dell.com/downloads/global/products/pvaul/en/cx3_infob.pdf>>, Aug. 2007, pp. 18.

* cited by examiner

*Primary Examiner* — Cheyne D Ly
(74) *Attorney, Agent, or Firm* — Danielle Johnston-Holmes; Micky Minhas

(57) ABSTRACT

An existing primary data copy can be maintained on an existing primary front end server node. One or more existing secondary data copies can be maintained on one or more existing secondary front end server nodes to minor the existing primary data copy (such as by making synchronous changes to the secondary data copies). One or more existing backup data copies can be maintained on an existing backend server node to mirror the existing primary data copy (such as by making asynchronous changes to the one or more backup data copies). The existing backend server node can be accessible by one or more of the front end nodes. In response to detecting a failure of the existing primary data copy, one of the one or more secondary data copies can be designated as a new primary data copy in place of the existing primary data copy.

20 Claims, 5 Drawing Sheets

FRONT END AND BACKEND REPLICATED STORAGE

BACKGROUND

Many large scale distributed systems store data in a centralized location and access the data from that location. Such a centralized location may use high-end hardware to increase performance and reliability. Such centralized storage often stores data in a format that is specific to a particular application that is accessing the data, and the storage is often done with storage software that is homogenous, where all the software is the same version even if multiple computing machines are acting as server nodes and are being used for storage.

SUMMARY

The tools and techniques discussed herein relate to front end and backend replicated storage. The storage can include a primary data copy on a front end server node that is replicated to one or more secondary data copies on one or more front end server nodes and to a backup data copy on a backend server node.

In one embodiment, the tools and techniques can include maintaining a primary data copy stored on a primary front end server node. A data change request can be received from a client. In response to the data change request, the primary front end server node can make one or more data changes to the primary data copy, where the change(s) are requested in the data change request. In response to the data change request, the one or more requested data changes can be synchronously made to one or more secondary data copies stored on one or more secondary front end server nodes. Also in response to the data change request, the requested data change(s) can be asynchronously made to a backup data copy stored on a backend server node.

In another embodiment of the tools and techniques, an existing primary data copy can be maintained on an existing primary front end server node. One or more existing secondary data copies can be maintained on one or more existing secondary front end server nodes to mirror the existing primary data copy. One or more existing backup data copies can be maintained on an existing backend server node to mirror the existing primary data copy. The existing backend server node can be accessible by one or more of the front end server nodes. In response to detecting a failure of the existing primary data copy, one of the one or more secondary data copies can be designated as a new primary data copy in place of the existing primary data copy.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
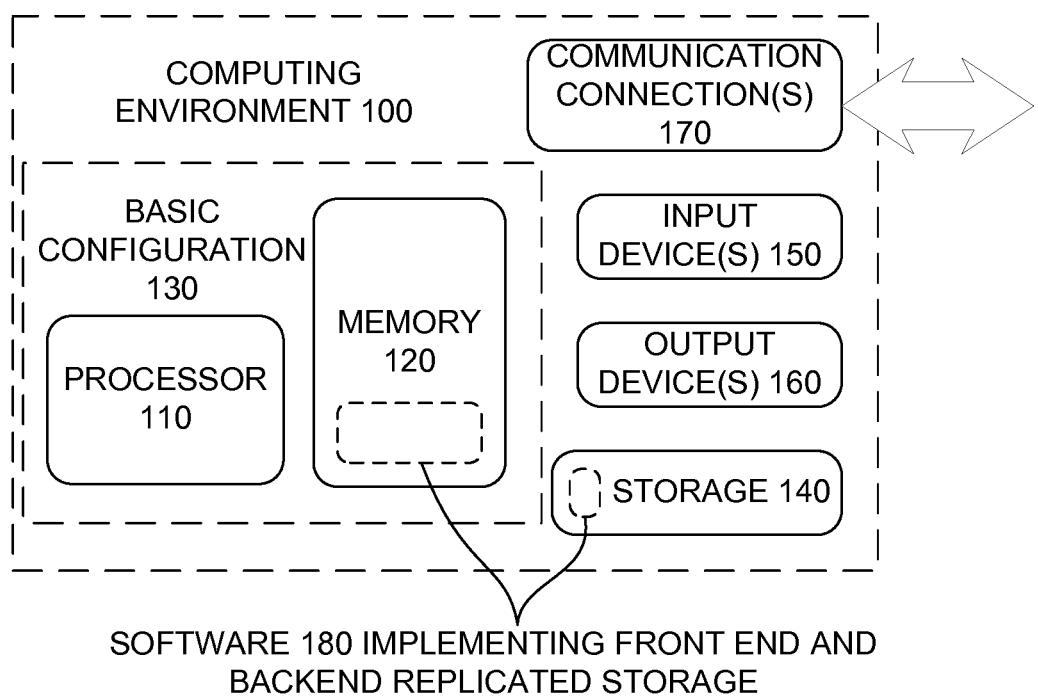
FIG. 1 is a block diagram of a suitable computing environment in which one or more of the described embodiments may be implemented.

Embodiments described herein are directed to techniques and tools for improved storage for front end and backend server nodes. Such improvements may result from the use of various techniques and tools separately or in combination.

Such techniques and tools may include a mechanism to maintain multiple copies of the primary data. For example, multiple secondary copies may be maintained on multiple front end server nodes. A secondary copy may become a primary copy, such as if a primary copy fails. The number of secondary copies may be customizable to trade off between availability and commit time, because the system may be configured so that the system will not return to a client until a quorum (e.g., a majority) of the secondary copies on the front end server nodes have committed requested data modifications. The system can provide an interface to allow applications to communicate with the system, such as an interface that provides for getting data, putting data, etc.

Such techniques and tools may also include having a backend server node that stores backup copies that can be used to recover data if the primary and secondary copies fail. The backend server node storage can be data agnostic and simple. Data agnostic refers to the backend server node being able to store data regardless of the specific format of the data. For example, the backend server node may merely require an identifier (e.g., a key) and a value for each unit of data. In addition to the identifier, the node may store additional metadata. For example, additional metadata may be stored for use in optimization and/or for other uses. The value may take any of various different forms. For example, one value may represent messaging data, while another value may represent conferencing data. All such values may be in a particular format, such as an XML format, which is not specific to the application or the particular data in represented by the value. Accordingly, the storage of the data can also be application agnostic, meaning that the same storage technique can be used, even for data that originates from and is managed by different applications. The backend server node can serve as a backup for the data, and can have a defined interface that allows multiple types of applications and server versions to use the backend server node for storage. The backend server node may be paired with another backend server node, and data copies from the backend server node may be replicated to the other backend server node for use in disaster recovery scenarios.

Accordingly, one or more substantial benefits may be realized from the tools and techniques described herein. For example, a cost effective scalable server system for stateful applications (applications that rely on persistent data for operation) may be provided. The server system may provide high availability and disaster recovery features. Additionally, the server system may be application agnostic, so that multiple types of applications with different sets of data with different data formats can be run using data maintained on the same server cluster.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described embodiments may be implemented. For example, one or more such computing environments can be used as a front end or backend server node, or a client. Generally, various different general purpose or special purpose computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing front and backend replicated storage.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as flash drives, magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "detect," "manage," "replicate," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Front End and Backend Replicated Storage System and Environment

A. System Description

Figure 2:
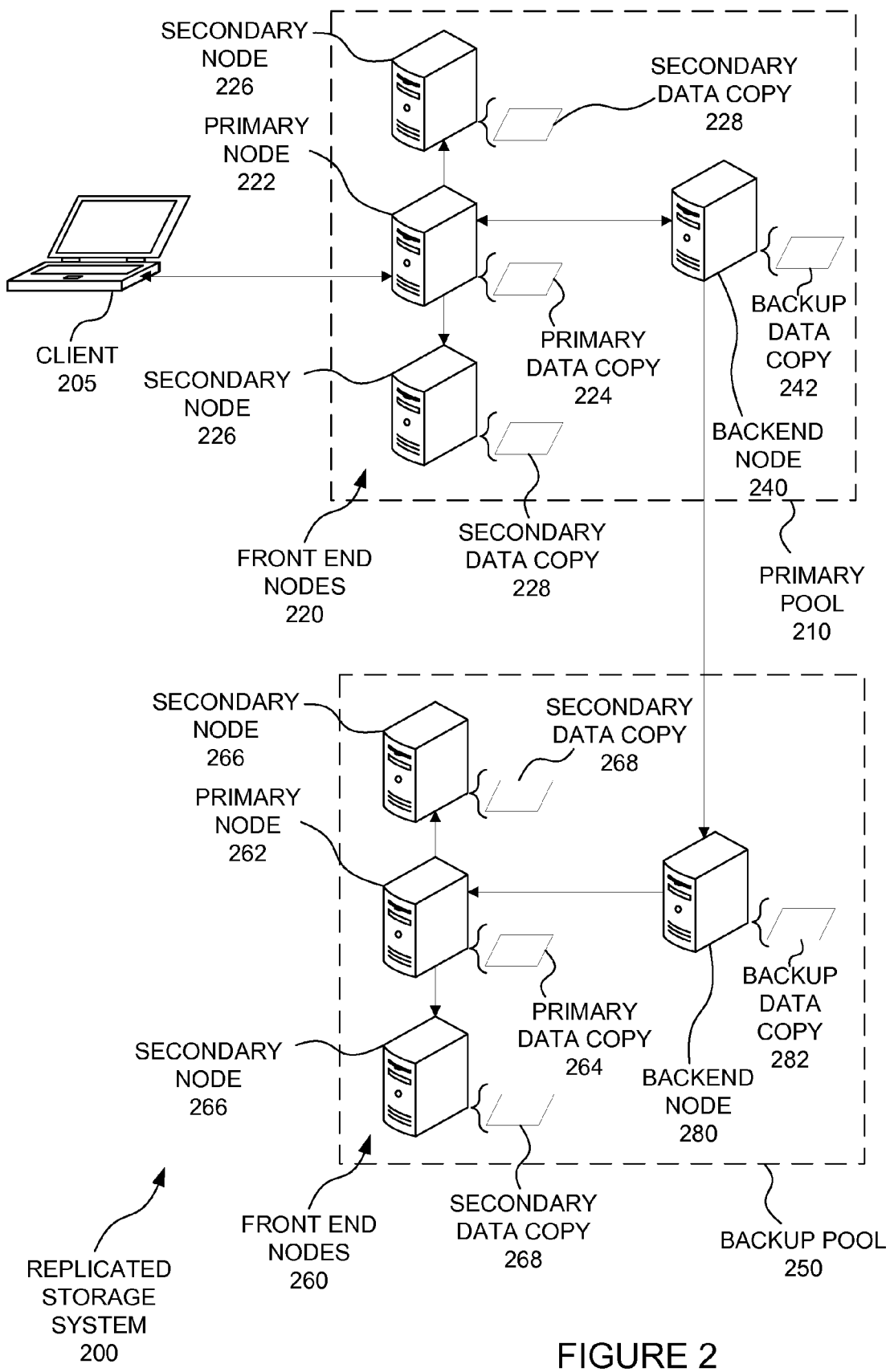
FIG. 2 is schematic diagram of a front end and backend replicated storage system.

FIG. 2 is a block diagram of a front end and backend replicated storage system (200) in conjunction with which one or more of the described embodiments may be implemented. The system (200) can include a client computer system or client (205) that can communicate with a primary computer system pool (210) so that the primary pool (210) can provide one or more services to the client (205). Note that while a single client (205) is illustrated here for the sake of simplicity, the primary pool (210) may communicate with multiple clients (205) in the same manner as is described herein. The primary pool (210) can be a computer cluster that works together to provide one or more services so that the primary pool (210) may behave in one or more respects as a single computing entity from the perspective of the client (205). For example, the primary pool (210) may provide a data storage service for one or more applications running on the client (205). Also, the primary pool (210) may run one or more applications for the client (205) and/or one or more applications may be distributed between the primary pool (210) and the client (205). For example, the client (205) may host an email client and the primary pool (210) may host a corresponding email server. As another example, the client (205) may host a video and audio conferencing client and the primary pool (210) may host a corresponding video and audio conferencing server or bridge.

At a given time, the primary pool (210) can include a primary node (222) that manages a primary data copy (224), which can be data that is utilized by an application running on the client (205) and/or the primary node (222). The client (205) can communicate with the primary node (222), such as through a computer network such as a global computer network, and the primary node (222) can provide services to the client (205). The primary pool (210) can also include one or more secondary nodes (226) that each manages a secondary data copy (228) that can be replicated from the primary data copy (224). When changes are made to the primary data copy (224), the replication to the secondary data copies (228) may be performed synchronously (i.e., so that changes are replicated to the secondary data copies (228) and committed in a quorum (a specified portion such as a majority) of the secondary data copies before reporting the result to the client (205)). Alternatively, data changes in the primary data copy (224) may be asynchronously replicated to the secondary data copies (228) (i.e., data changes to the primary data copy (224) can be committed and the result can be reported back without waiting for the data change to be replicated to and committed in the secondary data copies (228)).

The roles of primary node (222) and primary data copy (224) may be moved between nodes in the primary pool (210). For example, if the existing primary node (222) fails, then one of the secondary nodes (226) can be designated as the new primary node and its data copy can be designated as the new primary data copy. Such designations can be made by a computing entity such as a primary active manager within the primary pool (210). The designations can be used to route communications between the client (205) and the current primary node (222) so that the client (205) can gain access to the primary data copy (224).

The primary pool (210) can also include a backend node (240), which can host a backup data copy (242). For example, the backend node (240) can be a database server or a file server. The backup data copy (242) can be replicated from the primary data copy (224). For example, such replication may be performed asynchronously in a lazy manner, such as according to a periodic schedule and/or during low-traffic times for the primary node (222). The replication from the primary data copy (224) to the backup data copy (242) can be managed by a replication agent (not shown).

The replicated storage system (200) can also include a backup computer system pool (250), which can act as a backup, such as in a disaster situation where the primary pool (210) is no longer able to provide services to the client (205). In such a situation, the replicated storage system (200) can fail over from the primary pool (210) to the backup pool (250), and the backup pool (250) can continue providing services to the client (205). For example, such a failover may happen automatically in response to a failure of the primary pool (210), or it may occur in response to user input, such as from a system administrator.

The backup pool (250) can include front end nodes (260), which can include a primary node (262), which can host a primary data copy (264), and one or more secondary nodes (266), which can each host a secondary data copy (268). The backup pool (250) can also include a backend node (280), which can host a backup data copy (282).

The backend node (280) in the backup pool (250) can be paired with the backend node (240) in the primary pool (210), so that changes to the backup data copy (242) in the primary pool (210) can be replicated to the backup data copy (282) in the backup pool (250). Such replication can occur asynchronously, such as according to a periodic schedule and/or during times when the backend node (240) is not busy with other operations, such as synchronizing the backup data copy (242) with the primary data copy (224). This backup replication to the backup pool (250) may be managed by a backup service (not shown).

Changes to the backup data copy (282) in the backup pool (250) can be replicated to the primary data copy (264) in the backup pool (250). The changes to the primary data copy (264) can in turn be replicated from the primary data copy (264) to the one or more secondary data copies (268). Accordingly, changes to the primary data copy (224) in the primary pool (210) can be replicated via the backup data copy (242) in the primary pool (210) to the backup data copy (282) in the backup pool (250). Those changes can also be replicated from the backup data copy (282) to the primary data copy (264), and from the primary data copy (264) to the secondary data copies (268) in the backup pool (250). Alternatively, changes could be replicated directly from the backup data copy (282) to the secondary copies (268). Accordingly, the primary data copy (264) in the backup pool (250) can be updated to reflect changes in the primary data copy (264) in the primary pool (210). Thus, when the replicated storage system (200) switches over or fails over from the primary pool (210) to the backup pool (250), the primary node (262) can be ready to provide the client (205) with access to the primary data copy (264) in the backup pool (250) with little delay and with little data loss. However, there may be some data loss if all changes to the primary node (222) in the primary pool (210) have not been replicated to the backup pool (250) when the switch or failover is performed. Such a switch or failover can be managed by an overall management agent (not shown), which can route communications between the client (205) and either the primary pool (210) or the backup pool (250).

When a new data copy is created (e.g., a secondary data copy (228 or 268), or a backup data copy (242 or 282)), the copy can be created in one of various ways. For example, a complete copy of an originating copy to be replicated can be transferred to the new location using a copy technique. The resulting new copy can be updated to reflect any changes that may have been made to the originating copy. For example, this update may be performed by playing log files to the new copy. Subsequent changes to the originating copy can be replicated to the new copy by playing subsequent changes from log files to the new copy.

Each replicated operation can have a number associated with the operation. For each data copy, metadata can be maintained indicating a number of the most recent operation applied to the copy. It can be determined whether two nodes are synchronized by comparing which numbered operation is the most recent one to be applied to the node. For example, if operation ten has just been applied to the primary data copy (224) and to the backup data copy (242), then those copies are in sync. However, if operation fifteen has been applied to the primary data copy (224) but operations have only been applied to the backup data copy (242) through operation ten, then the difference between these (operations eleven through fifteen) can be provided to the backend node (240) and applied to the backup data copy (242) to update the backup data copy (242).

The replicated storage system (200) can receive user input to set configuration parameters that can adjust performance and/or availability characteristics of the system (200). For example, user input may dictate how many secondary data copies (228) are maintained in the primary pool (210) and/or how many secondary data copies (268) are maintained in the backup pool (250). As another example, user input may dictate how often data changes are replicated from the primary data copy (224) to the backup data copy (242), how often data changes are replicated from the backup data copy (242) in the primary pool (210) to the backup data copy (282) in the backup pool (250), and/or how often data changes are replicated from the backup data copy (282) in the backup pool (250) to the primary data copy (264) in the backup pool (250).

B. Characteristics of the System

Some characteristics of the replicated storage system (200) will now be discussed, although a system according to the description herein may not have all these characteristics. The replicated storage system can have a backend node (240) that is shared across the front end nodes (220). This backend node (240) can store the backup data copy (242) in an opaque format, which can allow different applications and different types of applications to store their data in the same backend node (240). The backend node (240) can be used as a backup for the front end nodes (220). The backend node (240) may also be used for initial bootstrapping of front end nodes (220), such as by using the copy-and-update techniques discussed above. The backend node (240) may not be needed for regular operation of the primary pool (210) providing the service to the client (205). Accordingly, this architecture can decrease the possibility of the backend node (240) becoming a bottleneck that will slow down the operation of the primary pool (210).

The backend node (240) can be a simple data agnostic storage device that can have its own service level agreement. The backend nodes of two pools (210 and 250) that are each acting as a server can be paired for disaster recovery. User input can be provided to indicate whether such paring of backend nodes (240 and 280) in different pools (210 and 250) is to be done. For example, such pairing may not be used if the backend node (280) is highly available and has its own disaster recovery mechanism. When two backend nodes (240 and 280) are paired, the data in those nodes (240 and 280) can be kept in sync (though with some delay to allow for lazy write schedules, etc.). This can allow data to be recovered in the event of a disaster. For example, the primary pool (210) and the backup pool (250) may be in different data centers in different geographical locations. Accordingly, if the data center housing the primary pool (210) fails, then the backup pool (250) can continue providing services using the backup data copy (282) and/or the primary data copy (264) in the backup pool (250).

When an entity (user, application using the system, etc.) changes the data, the changes can be replicated to multiple copies of the data within the primary pool (210). This allows the data to be available even in the event of failures. User input may be provided to designate the number of secondary data copies (228). Choosing this number can involve a trade-off between data availability and commit interval. For instance, having a large number of copies can make the system highly resilient to failures, but can increase the time for an operation to be committed (because more replications are made to more secondary data copies (228) before the data changes are committed). The data that was modified can be lazily written to the backup data copy (242) in the backend node (240). A write interval for this lazy write operation can be determined from the service level agreement for disaster recovery.

When a node is added to the primary pool (210), the new node can get its data from one or more of multiple sources. For example, the new node might be a front end node (220) that gets its data from another front end node (220), if the data is available from another front end node (220). The new node might get the data from the backend node (240) if none of the existing front end nodes (220) have the data. The same thing can be done for adding nodes to the backup pool (250). Either way, the replicated storage system (200) can be expanded to have data copies maintained in additional nodes without downtime for the replicated storage system (200).

Additionally, the data can be stored in data copies and transmitted in an opaque format (e.g., using key-value pairs) without the pools (210 or 250) interpreting the data. Accordingly, this can allow multiple applications to be built on the same replicated storage system (200), and it can allow multiple different software and/or hardware versions to be used within the replicated storage system (200).

III. Front End and Backend Replicated Storage Techniques

Several front end and backend replicated storage techniques will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable storage media may have computer-executable instructions embodied thereon that, when executed by at least one processor, cause at least one processor to perform the technique. The techniques discussed below may be performed at least in part by hardware logic.

Figure 3:
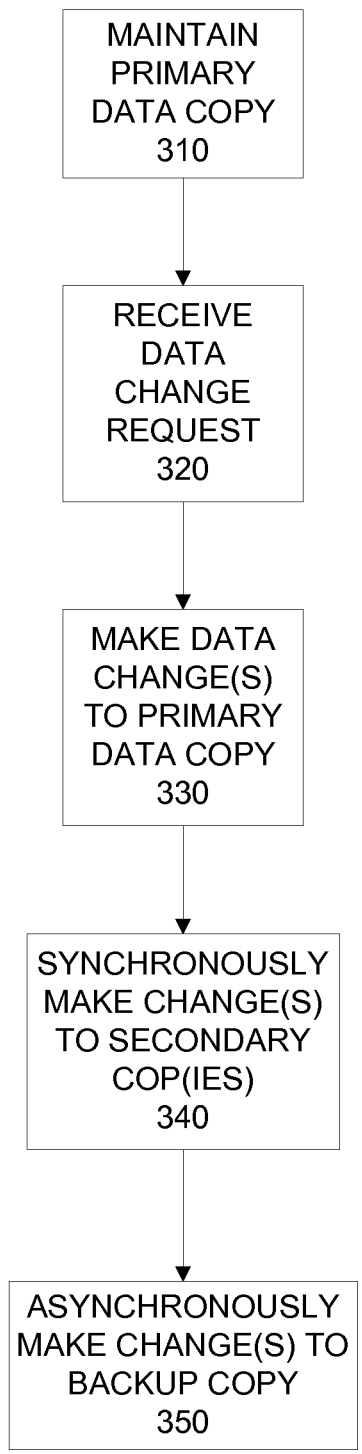
FIG. 3 is a flowchart of a front end and backend replicated storage technique.

Referring to FIG. 3, a front end and backend replicated storage technique will be discussed. The technique can include maintaining (310) a primary data copy stored on a primary front end server node. A data change request can be received (320) from a client. In response to the data change request, the primary front end node can make (330) one or more data changes requested in the data change request to the primary data copy. Also in response to the data change request, the data change(s) can be synchronously made (340) to one or more secondary data copies stored on one or more secondary front end server nodes. In response to the data change request, the requested data change(s) can be asynchronously made (350) to a backup data copy stored on a backend server node.

The technique may further include designating one of the one or more secondary data copies as a new primary data copy in place of the existing primary data copy. This designation may be performed automatically in response to detecting the failure of the existing primary data copy. The primary front end node and the secondary front end node(s) can store the primary and secondary data copies in an application agnostic format. The backend node can also store the backup data copy in an application agnostic format.

The technique can further include detecting a failure of the primary front end node. In response to the failure, one of the secondary front end node(s) can be designated as a new primary front end node. The backend node can be a first backend node. The technique can further include, in response to the data change request, asynchronously replicating the one or more requested data changes from the first backend node to a backup data copy on a second backend server node that is paired with the first backend node. The technique can also include replicating the requested data change(s) from the second backend node to one or more data copies on one or more front end server nodes associated with the second backend node.

The primary data copy can be termed an existing primary data copy, and the one or more secondary copies may be termed one or more existing secondary copies. The method can further include replicating the backup data copy from the backend server node to form a new primary copy on a new primary front end server node and one or more new secondary copies on one or more new secondary front end server nodes. This replication can be performed automatically in response to detecting failures of the existing primary data copy and the one or more existing secondary data copies.

The technique can further include designating one of the one or more data copies on the one or more front end nodes associated with the second backend node as a new primary data copy in place of the existing primary data copy.

Figure 4:
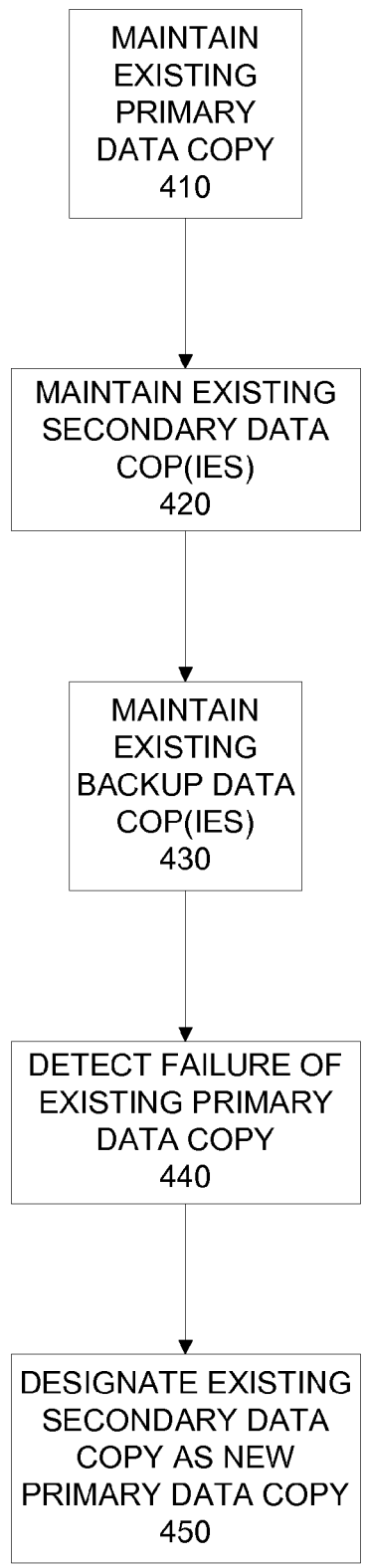
FIG. 4 is a flowchart of another front end and backend replicated storage technique.

Referring now to FIG. 4, another front end and backend replicated storage technique will be discussed. The technique can include maintaining (410) an existing primary data copy on an existing primary front end server node. One or more existing secondary data copies can be maintained (420) on one or more existing secondary front end server nodes to minor the existing primary data copy. The technique can further include maintaining (430) one or more existing backup data copies on an existing backend server node to minor the existing primary data copy. The existing backend node can be accessible by one or more of the front end nodes, such as through an interface. A failure of the existing primary data copy can be detected (440), and in response to detecting the failure, one of the one or more secondary data copies can be automatically designated (450) as a new primary data copy in place of the existing primary data copy.

The existing primary front end node and the existing secondary front end node(s) can store the existing primary and secondary data copies in an application agnostic format. Also, the existing backend node can store the existing backup data copies in an application agnostic format. The format may be separated into an identifier such as a key, and a value, which can represent the stored data.

The backend node can be termed a first backend node. The technique can further include maintaining a backup data copy on a second backend server node that is paired with the first backend node. Additionally, the technique can include maintaining one or more additional secondary data copies on one or more additional front end server nodes that are able to access the second backend server node. The technique may further include designating one of the one or more additional secondary copies on one of the additional front end nodes as a new primary data copy in place of the existing primary data copy.

The technique of FIG. 4 may further include replicating at least one of the one or more existing backup data copies on the backend server node to form a new primary data copy on a new primary front end server node and one or more new secondary copies on one or more new secondary front end server nodes.

Figure 5:
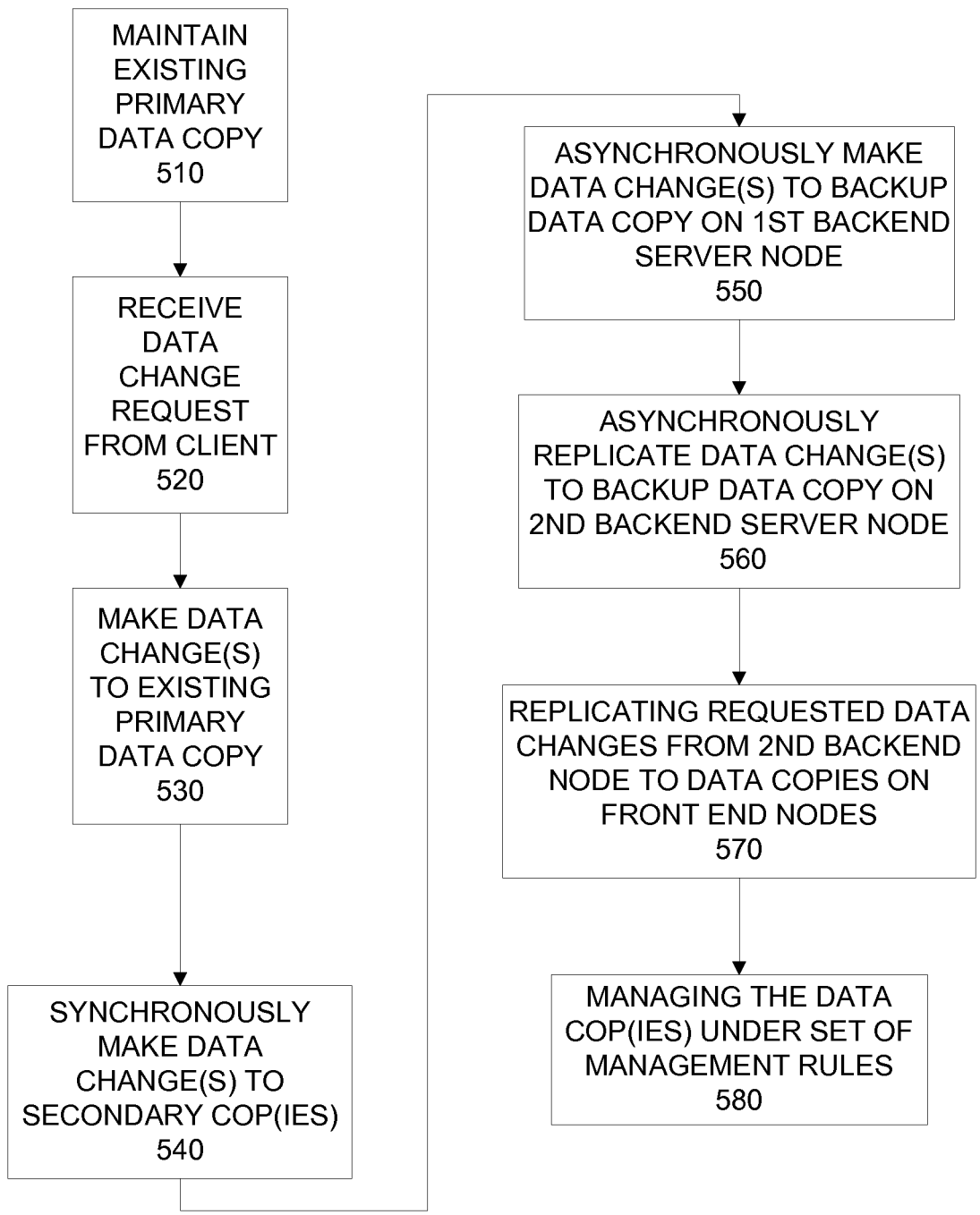
FIG. 5 is a flowchart of yet another front end and backend replicated storage technique.

Referring now to FIG. 5, yet another front end and backend replicated storage technique will be discussed. The technique can include maintaining (510) an existing primary data copy. The existing primary data copy can be maintained (510) on an existing primary front end server node in an application agnostic format that includes one or more key-value pairs. A data change request can be received (520) from a client. In response to the data change request, the existing primary front end server node can make (530) one or more data changes requested in the data change request. These changes can be made (530) to the existing primary data copy. Also in response to the data change request, the one or more requested data changes can be synchronously made (540) to one or more application agnostic secondary data copies on one or more secondary front end server nodes. The secondary data copies can include one or more key-value pairs. In response to the data change request, the one or more requested data changes can be asynchronously made (550) to one or more application agnostic backup data copies. The backup data copies can include one or more key-value pairs, and can be on a first backend server node. Additionally, in response to the data change request (which may be timed in line with a schedule such as periodic schedule), the one or more requested data changes can be replicated (560) from the first backend node to a backup data copy on a second backend server node that is paired with the first backend node. The technique can also include replicating (570) the one or more requested data changes from the second backend node to one or more data copies on one or more front end server nodes associated with the second backend node. The one or more data copies can be managed (580) under a set of management rules that provides one or more criterion under which any of the data copies that is not already a primary data copy and is stored on any of the front end server nodes can become a new primary data copy.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
   maintaining an existing primary data copy stored on an existing primary front end server node;
   receiving a data change request from a client;
   in response to the data change request, making, via the primary front end server node, one or more data changes requested in the data change request to the existing primary data copy;
   in response to the data change request, synchronously making the one or more requested data changes to one or more existing secondary data copies stored on one or more existing secondary front end server nodes;
   in response to the data change request, asynchronously making the one or more requested data changes to a backup data copy stored on a backend server node; and
   replicating the backup data copy from the backend server node to form a new primary copy on a new primary front end server node and one or more new secondary data copies on one or more new secondary front end server nodes.

2. The method of claim 1, wherein the primary front end server node and the one or more secondary front end server nodes store the primary and secondary data copies in an application agnostic format.

3. The method of claim 1, wherein the backend server node stores the backup data copy in an application agnostic format.

4. The method of claim 1, further comprising detecting a failure of the primary front end server node, and in response to the failure, designating one of the one or more secondary front end server nodes as a new primary front end server node.

5. The method of claim 1, wherein the backend server node is a first backend server node and the method further comprises, in response to the data change request, asynchronously replicating the one or more requested data changes from the first backend server node to a backup data copy on a second backend server node that is paired with the first backend server node.

6. The method of claim 5, further comprising replicating the one or more requested data changes from the second backend server node to one or more data copies on one or more front end server nodes associated with the second backend server node.

7. The method of claim 6, wherein the primary data copy is an existing primary data copy, and wherein the method further comprises designating one of the one or more data copies on the one or more front end server nodes associated with the second backend server node as a new primary data copy in place of the existing primary data copy.

8. The method of claim 1, wherein the primary data copy is an existing primary data copy, and wherein the method further comprises designating one of the one or more secondary data copies as a new primary data copy in place of the existing primary data copy.

9. The method of claim 8, wherein the method further comprises detecting a failure of the existing primary data copy, and wherein designating the one of the one or more secondary data copies as the new primary data copy is performed automatically in response to detecting the failure of the existing primary data copy.

10. The method of claim 1, wherein the method further comprises detecting failures of the existing primary data copy and the one or more existing secondary data copies, and wherein replicating the backup data copy is performed automatically in response to detecting the failures.

11. A computer system comprising:
    at least one processor; and
    memory comprising instructions stored thereon that when executed by at least one processor cause at least one processor to perform acts comprising:
      maintaining an existing primary data copy stored on an existing primary front end server node;
      receiving a data change request from a client;
      in response to the data change request, making, via the primary front end server node, one or more data changes requested in the data change request to the existing primary data copy;
      in response to the data change request, making the one or more requested data changes to one or more existing secondary data copies stored on one or more existing secondary front end server nodes;
      in response to the data change request, making the one or more requested data changes to a backup data copy stored on a backend server node; and
      replicating the backup data copy from the backend server node to form a new primary copy on a new primary front end server node and one or more new secondary data copies on one or more new secondary front end server nodes.

12. The computer system of claim 11, wherein the existing primary front end server node and the one or more existing secondary front end server nodes store the existing primary and secondary data copies in an application agnostic format.

13. The computer system of claim 11, wherein the backend server node stores the backup data copy in an application agnostic format.

14. The computer system of claim 13, wherein the format is separated into an identifier and a value.

15. The computer system of claim 11, wherein the acts further comprise replicating at least one of the one or more existing backup data copies on the backend server node to form a new primary data copy on a new primary front end server node and one or more new secondary copies on one or more new secondary front end server nodes.

16. One or more computer-readable storage media having computer-executable instructions embodied thereon that, when executed by at least one processor, cause at least one processor to perform acts comprising:

maintaining an existing primary data copy on an existing primary front end server node;

receiving a data change request from a client;

in response to the data change request, the existing primary front end server node making one or more data changes requested in the data change request to the existing primary data copy;

in response to the data change request, synchronously making the one or more requested data changes to one or more secondary data copies on one or more secondary front end server nodes;

in response to the data change request, asynchronously making the one or more requested data changes to one or more backup data copies on a first backend server node; and in response to the data change request, asynchronously replicating the one or more requested data changes from the first backend server node to a backup data copy on a second backend server node that is paired with the first backend server node.

17. The computer system of claim 11, wherein the backend server node is a first backend server node and the acts further comprise:

maintaining a backup data copy on a second backend server node that is paired with the first backend server node;

maintaining one or more additional secondary data copies on one or more additional front end server nodes that are able to access the second backend server node; and designating one of the one or more additional secondary data copies on one of the additional front end server nodes as a new primary data copy in place of the existing primary data copy.

18. The computer system of claim 17, wherein the existing primary front end server node and the one or more existing secondary front end server nodes are in a primary pool that is a computer cluster.

19. The computer system of claim 18, wherein the one or more additional front end servers are in a backup pool, and wherein the primary pool and the backup pool are in different datacenters.

20. The computer system of claim 11, wherein the making of the one or more requested data changes to the one or more existing secondary data copies is done synchronously in response to the data change request, and the making of the one or more requested data changes to the backup data copy is done asynchronously in response to the data change request.

* * * * *